United States Patent

Hance

[11] Patent Number: 5,622,504
[45] Date of Patent: Apr. 22, 1997

[54] REUSABLE BULLETIN BOARD DISPLAY

[75] Inventor: Wilma J. Hance, Knoxville, Tenn.

[73] Assignee: Jamie H. Tarziers, Fairhope, Ala.

[21] Appl. No.: 425,797

[22] Filed: Apr. 20, 1995

[51] Int. Cl.⁶ ............................................. G09B 29/00
[52] U.S. Cl. ............................... 434/430; 434/421
[58] Field of Search .................... 434/429, 430, 434/421, 416, 408; 40/616, 591

[56] References Cited

U.S. PATENT DOCUMENTS

| | | |
|---|---|---|
| 641,283 | 1/1900 | Evans . |
| 1,225,305 | 5/1917 | Barnard . |
| 1,272,021 | 7/1918 | D'Olier, Jr. . |
| 1,509,407 | 9/1924 | MacQuarrie . |
| 1,816,353 | 7/1931 | Anderson . |
| 2,195,985 | 4/1940 | Fox ............................ 434/430 |
| 3,156,056 | 11/1964 | Pribil .......................... 434/421 |
| 3,168,787 | 2/1965 | Surrey ......................... 434/430 |
| 3,263,347 | 8/1966 | McCutcheon ................ 434/430 |
| 3,484,956 | 12/1969 | Nightingale .................. 434/416 |
| 3,497,969 | 3/1970 | Schwoegler .................. 434/421 |
| 3,678,456 | 7/1972 | Gruber .......................... 40/591 |
| 4,011,671 | 3/1977 | Fogel et al. ................. 434/430 |
| 4,178,700 | 12/1979 | Dickey ........................ 35/23 R |
| 4,245,401 | 1/1981 | Riehle ........................ 434/430 |
| 4,250,216 | 2/1981 | Janssen ....................... 434/430 |
| 4,471,873 | 9/1984 | Thomas ......................... 40/591 |
| 4,511,161 | 4/1985 | Gruner ........................ 434/430 |
| 4,584,223 | 4/1986 | Krapf ......................... 434/430 |
| 4,624,642 | 11/1986 | Ferrara ....................... 434/274 |
| 4,744,189 | 5/1988 | Wilson ........................ 434/430 |
| 4,828,502 | 5/1989 | Leahy ......................... 434/421 |
| 5,035,626 | 7/1991 | Persing ....................... 434/429 |
| 5,110,295 | 5/1992 | Concra ........................ 434/416 |

*Primary Examiner*—Paul J. Hirsch
*Attorney, Agent, or Firm*—Pitts & Brittian, P.C.

[57] ABSTRACT

A reusable bulletin board display (10) for use in education. The reusable bulletin board display (10) is trimmed to fit on conventional bulletin boards (26), or other similar surfaces, according to pre-marked indicators (28) concentrically disposed about the border (24) of the display (10), mounted on the conventional bulletin board (26) by use of at least one attachment device (22), and set up and used according to the particular need. The reusable bulletin board display (10) may also be used for promotional, exhibition or advertising purposes. When the reusable bulletin board display (10) is no longer needed, it is dismounted from the conventional bulletin board (26), rolled up, placed in a storage device (40), and the storage device (40) is labelled using the preferred method of identification. The storage device (40) in which the reusable bulletin board display (10) is received is then stored until needed once again. At that time, the reusable bulletin board display (10) is simply retrieved, removed from the storage device (40) and remounted.

9 Claims, 3 Drawing Sheets

REUSABLE BULLETIN BOARD DISPLAY

TECHNICAL FIELD

This invention relates to the field of educational devices. More specifically, this invention relates to bulletin board displays which may be used for educational purposes to aid teachers in more efficiently setting up educational displays, more effectively developing students' comprehension for the particular curriculum, and more readily storing said displays for future use.

BACKGROUND ART

In the field of education, it is well known that bulletin board displays are an integral part of the teaching process. Said displays are used for a multitude of purposes, including skills instruction, incentive promotion and/or recognition. Among the skill instruction uses, for example, are mathematics, phonetics, and geography.

It is also well known that significant time, energy and raw materials are required to prepare such displays, dismantle them after use and, where possible, store them. A goal of educators today is to reduce the time required to complete such administrative tasks so that more time can be devoted to instructional purposes. A second goal of educators today is to reduce storage requirements of teaching materials to provide greater learning areas for their students. A further goal of educators is to reduce waste and thereby conserve resources. In view of these goals, it is thereby desirable to save valuable teaching time and to be able to conveniently store and reuse bulletin board displays and display materials.

Other displays devices have been produced to serve various functions. Typical of the art are those displays disclosed in the following U.S. patents:

| U.S. Pat. No. | Inventor(s) | Issue Date |
|---|---|---|
| 641,283 | C. A. Evans | Jan 16, 1900 |
| 1,225,305 | J. H. Barnard | May 05, 1917 |
| 1,272.021 | H. D'Olier, Jr. | Jul 09, 1918 |
| 1,509,407 | A. E. MacQuarrie | Sep 23, 1924 |
| 1,816,353 | M. Anderson | Jul 28, 1931 |
| 4,178,700 | A. M. Dickey | Dec 18, 1979 |
| 4,624,642 | A. N. Ferrara | Nov 25, 1986 |

The display disclosed by Evans in the '283 patent is a longitudinally mounted and framed cushion which is covered by a screened gauze field and marked by insertion of pins through the field. This particular display lacks durability, flexibility, convenience of preserving the entire display in an assembled form and ease of storage.

The '305 patent issued to Barnard discloses sectional mountings for charts, maps, diagrams and the like using a series of interlocking blocks for convenience of storage. This particular display lacks the flexibility of structure and of diverse applications and the convenience of preserving the display in assembled form.

The '021 patent issued to D'Olier, Jr. discloses a fixed chart used with diagrams or words indicating variable degrees of light concentration obtainable by varying combinations of lamp wattage, holders, and reflectors. Like the '283 patent, this particular display lacks the convenience of dimension. Like the '305 patent, this particular display lacks the flexibility of use and storage.

The '407 patent issued to MacQuarrie discloses a support device that may be affixed to classrooms walls to support maps hung in a variety of positions. This particular display appears to be inapplicable to the subject invention.

The '353 patent issued to Anderson discloses a display comprised of a plurality of transparent or semitransparent sheets which may stand alone or be employed in combination for advertising, amusement or education. This particular display lacks versatility of application, durability and ease of use and storage of the subject invention.

The '700 patent issued to Dickey discloses a rectangular board constructed to fold in half and be portable. During use, the panel may be hung by the handle using a nail, screw or other projection. The face of the board bears a background design and slot pockets to secure scenery changes and show pieces. This particular board lacks the ease of use and storage, the convenience of preserving the display in its assembled form, and the versatility of use of the claimed invention.

The '642 patent issued to Ferrara discloses a wood-framed, metallic "apparatus" upon which views of the human spine are described. Magnetized pieces depicting portions of the spine are used to overlay the spine and demonstrate variations in spinal integrity. Like the '700 patent, this panel also lacks the flexibility, ease of storage and versatility of use of the claimed invention.

Therefore, it is an object of this invention to provide a means for using and reusing bulletin board displays and storing said displays in a readily accessible manner.

DISCLOSURE OF THE INVENTION

Other objects and advantages will be accomplished by the present invention which allows for the construction and attachment of reusable bulletin board displays to conventional bulletin boards, or other similar surfaces, to assist in providing educational instruction to students and convenient storage of said displays after use.

The reusable bulletin board display of the present invention includes a substrate of durable and flexible composition, having a front side and a back side, a laminate fabricated from conventional materials, which is disposed about a substantial portion of said front side and said back side of said substrate, at least one attachment device disposed about the perimeter of the back side of said reusable bulletin board display for attachment to a conventional bulletin board, or other similar surface, and a storage device consisting of a receptacle and cap member, which member is coded for identification of the contained bulletin board display.

The front side of the reusable bulletin board display defines a background disposed about at least one portion of the surface of said substrate, at least one border disposed above the background and about the perimeter of said substrate, at least one image within said border, and at least one interactive display area.

The back side of the reusable bulletin board display is pre-marked to indicate the various sizes to which the display may be cut and the suggested locations for attachment devices. A plurality of indicators are concentrically disposed about a perimeter of the back side of the reusable bulletin board display to indicate alternative size adjustments and enable said display to fit various bulletin board sizes. The reusable bulletin board display is attached to a conventional bulletin board, or similar surface, with at least one attachment device, which may be selected from a group consisting of at least staples, nails, tacks and hook and loop fasteners, said device being disposed about the perimeter of the back side of said display.

For storage, the reusable bulletin board display is flexibly rolled up and enclosed in a storage device which includes a receptacle and a cap member. The cap member possesses an area for identification information regarding the bulletin board display contained within said receptacle.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
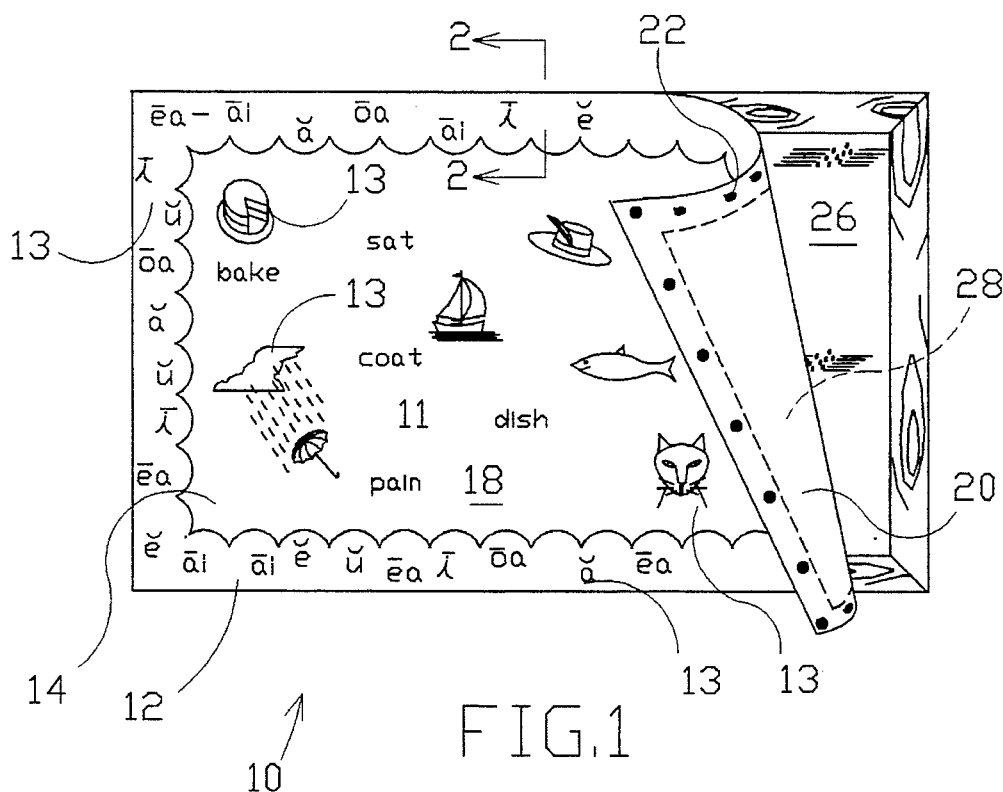
FIG. 1 is a front elevation view of the reusable bulletin board display constructed in accordance with several features of the present invention showing the front side thereof as well as a partial overlay of the back side thereof and a portion of a conventional bulletin board.

A reusable bulletin board display incorporating various features of the present invention is illustrated generally at 10 in the figures. The preferred embodiment of the reusable bulletin board display 10, or reusable display 10, is designed for educational purposes. There are, however, several additional uses for the reusable display 10. These include advertising, exhibition, promotion and entertainment. In the preferred embodiment, the reusable bulletin board display 10 is designed to enable educators to save valuable time, resources and classroom space. A further design of the preferred embodiment of the reusable display 10, thereby, is to enhance an educator's ability to educate.

The reusable bulletin board display 10 is constructed of a durable substrate 36, a laminate 16, at least one attachment device and a storage device 40. The substrate 36 is constructed of diverse materials according to use, including heavy ply paper or cardboard, magnetic or nonmagnetic media, and static electrically sensitive surfaces. The laminate 16 is similarly composed of a durable and flexible material which may be translucent or semi-translucent. In the preferred embodiment, the reusable bulletin board display 10 is composed of a heavy ply paper or cardboard substrate 36 and a translucent laminate 16.

The front side 18 of the reusable display 10 includes a background 11, at least one border 12, and an interactive area 14, each of which is beneath the laminate 16 surface.

Figure 6:
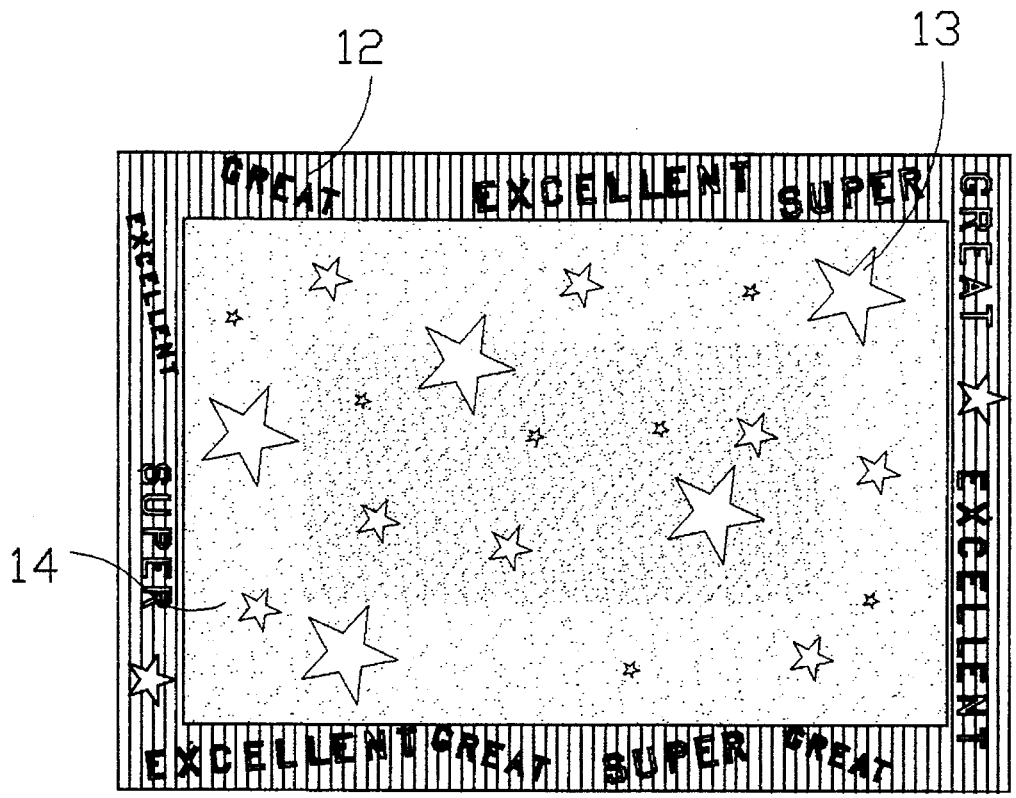
FIG. 6 illustrates an alternative embodiment of the front side of the reusable bulletin board display.
Figure 7:
FIG. 7 illustrates a further alternative embodiment of the front side of the reusable bulletin board display.

The background 11 is affixed to the surface of said substrate 36 and may be composed of any variety of images 13 or non-images of any color and dimension. FIG. 1 illustrates an example of the preferred embodiment. In FIG. 1, the images 13 placed on the background 11 define the subject for discussion. In using this particular display 10, for example, a teacher herself, or a student, could compare and contrast the images 13 contained on the background 11 with those in the border 12. FIGS. 6 and 7 illustrate two additional examples of how images 13 or non-images may be incorporated into the background 11 to convey a particular theme or topic. The types of images 13 or non-images which may be employed in the background 11 are defined solely by the use for which the reusable bulletin board display 10 is intended.

The border 12 is similarly adaptable to the particular use of the reusable display. The border 12 may be of any size, shape or color as would most effectively utilize the reusable bulletin board display 10. FIG. 1 again illustrates an example of the preferred embodiment. In FIG. 1, the border 12 is disposed about the entire perimeter of the reusable display 10, is colored and contains images 13 which reflect the particular activity for which the reusable bulletin board display 10 is being used. FIGS. 6 and 7, again provide two additional examples of the use of images 13 in the border 12 area. The illustrations, which demonstrate the disposal of a border 12 about the entire perimeter of the reusable display 10, are not intended to limit the use of this border 12. Alternative uses for the border 12 include disposing it about the four corners of the reusable bulletin board display 10 alone, disposing the border 12 about any one portion of the reusable display 10, and/or disposing the border 12 about varying points of the perimeter of the reusable display 10.

The interactive area 14 of each reusable bulletin board display 10 facilitates demonstration and interaction. FIG. 1 provides a demonstrative use illustration of the reusable display 10. In such instances, the reusable bulletin board display 10 is used to provide the teacher with a fixed display of facts pertaining to a particular topic such as geography, for example. Other interactive uses for the reusable display 10 include the posting of acknowledgements or rewards for a particular task well done, as shown in FIG. 6, or the posting of students names and photographs at the beginning of the fall semester in elementary school to help students identify their classmates, as illustrated in FIG. 7. Here again, the variety of uses of the interactive area 14 of the reusable bulletin board display 10 are defined solely by the use for which the reusable display 10 is intended.

The specific methods of interchange with the interactive area 14 of the reusable bulletin board display 10 vary according to the composition of the substrate 36. Where the substrate 36 is a durable ply paper or cardboard, items are affixed to the interactive area 14 of the reusable display 10 using methods including thumbtacks, staples or tape. Where the substrate 36 is of metallic or electrostatic composition, other methods of attachment including electrostatically charged materials or magnets are also used. These methods of attachment to the interactive area 14 of the reusable display 10 are merely representative of current methods.

The back side 20 of the reusable bulletin board display 10 may include indicators 28, which define the various sizes to which the display 10 may be trimmed to fit existing conventional bulletin boards 26, and an area for the placement of at least one attachment device 22. Reference to conventional bulletin boards in this discussion is not intended to limit the use of the reusable display 10 to bulletin boards alone as there are other similar surfaces to which the reusable display may be adapted including, for example, blackboards and exhibition, advertising or promotional display stands. The indicators 28 are concentrically disposed about the back side 20 of the reusable bulletin board display 10 and located in areas to fit most conventionally sized bulletin boards 26 or other similar surfaces. In the preferred embodiments, the reusable display 10 ranges in size from 3'×4' to 4'×8' such that it may easily be managed by one or two people and may be put in place or removed quickly and easily.

Figure 2:
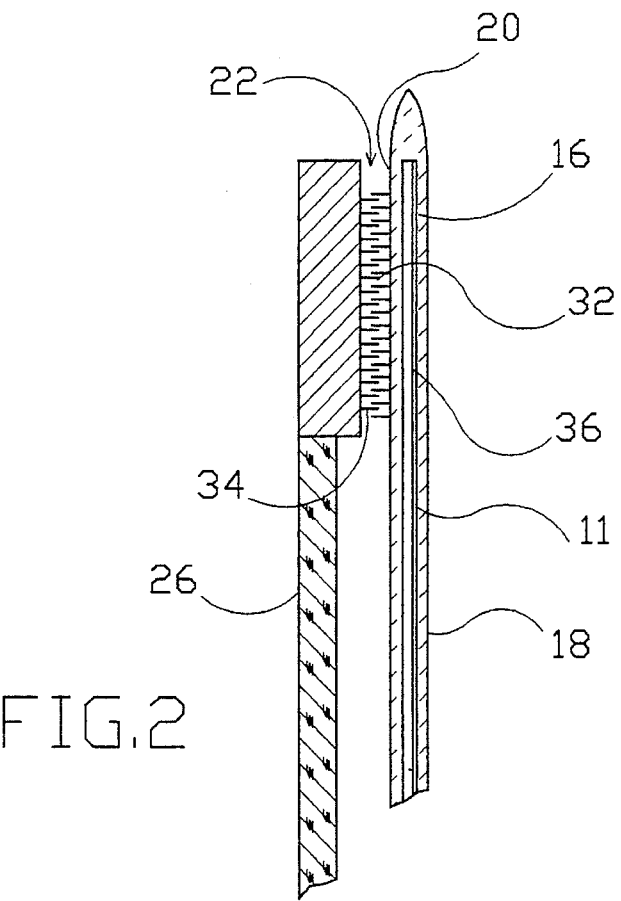
FIG. 2 is a partial side, in section, of the reusable bulletin board display constructed in accordance with several features of the present invention taken along 2—2 of FIG. 1.
Figure 5:
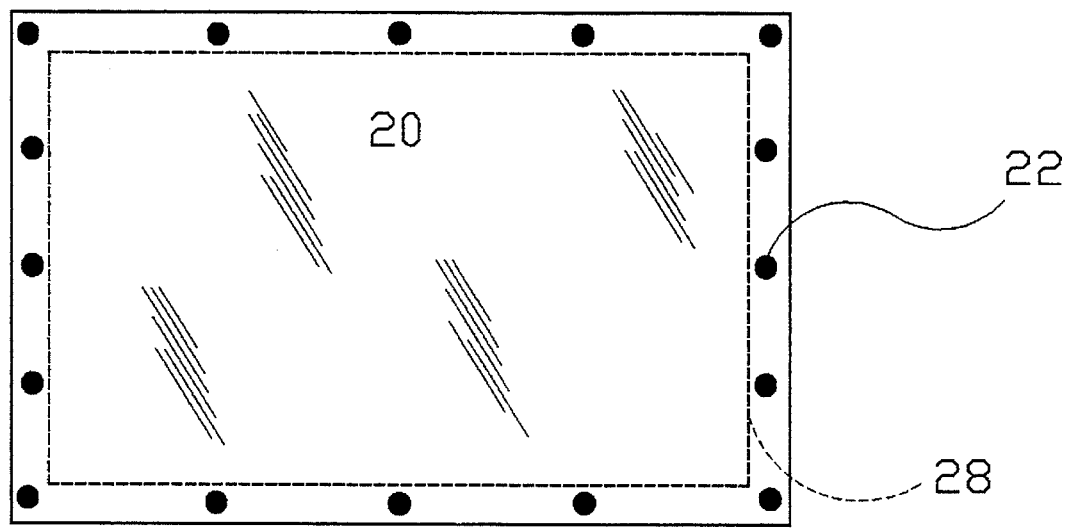
FIG. 5 illustrates a back elevation view of the reusable bulletin board display constructed in accordance with several features of the present invention.

At least one attachment device 22 is disposed on the back side 20 of the reusable bulletin board display 10 to provide a method for attaching the reusable display 10 to the conventional bulletin board 26 or other similar surface. FIG. 5 illustrates the preferred embodiment of the back side 20 of the reusable bulletin board display 10. In this embodiment, more than one attachment device 22 is disposed about the perimeter of the back side 20 of the reusable display 10 and the attachment device 22 itself is a hook 32 and loop 34 fastener. FIG. 2 illustrates a cross-section of the preferred embodiment for the hook 32 and loop 34 fastener. The demonstration of this embodiment is not intended to limit the type, number or disposition of the attachment devices about the back side 20 of the reusable bulletin board display 10. It is simply intended as an example of a different method of attaching the reusable display 10 to a conventional bulletin board 26 or other similar surface. Examples of other means of attachment include but are not limited to nails, tacks, screws and/or tape.

Figure 3:
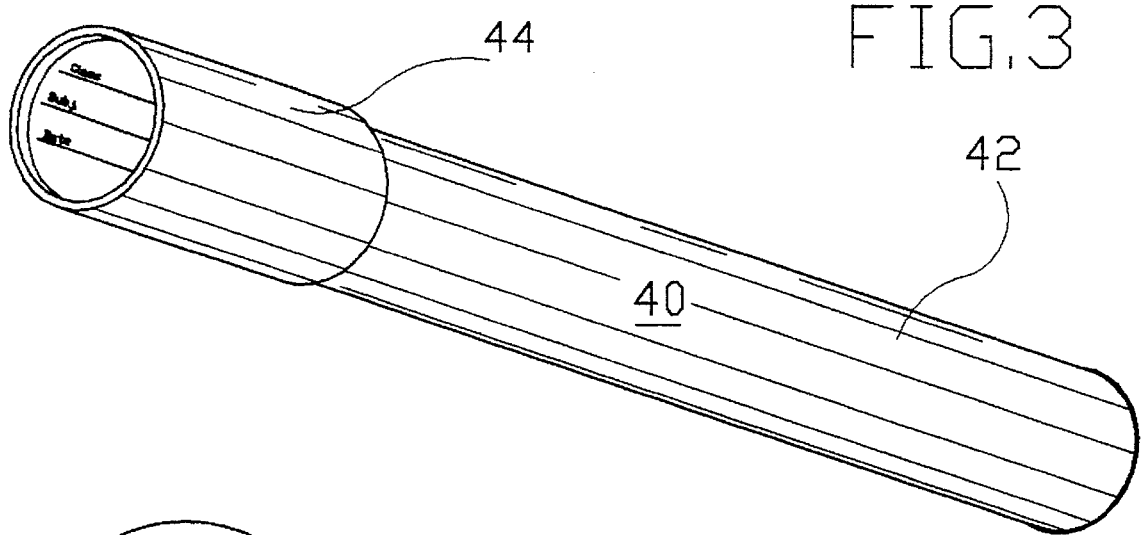
FIG. 3 is a perspective view of the storage device with cap member constructed in accordance with several features of the present invention showing a side thereof.
Figure 4:
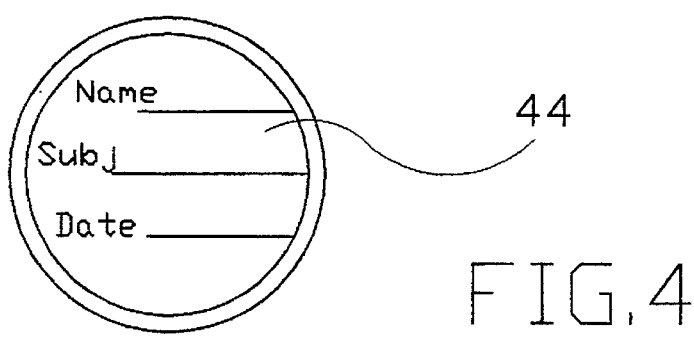
FIG. 4 is an end view of the cap member to the storage device constructed in accordance with several features of the present invention showing the front side thereof.

The reusable bulletin board display storage device 40, as illustrated in FIG. 3, is composed of a receptacle 42 and a cap member 44. In the preferred embodiment, as also shown in FIG. 3, the receptacle 42 and cap member 44 are composed of durable ply paper or cardboard and are of similar shape and color. Several other materials are useful in fabrication of said storage device 40 including plastic, wood, paper, and metal. In the preferred embodiment reflected in FIG. 3, the storage device 40 is cylindrical and defines a circular cross-section. Among the other cross-sections of the storage device contemplated 40 are oval, square, elliptical, rectangular and triangular, depending on the available storage space. Alternative embodiments of the storage device 40 may vary either or both the shape or color of the receptacle 42 or cap member 44. As illustrated in FIGS. 3 and 4 in the preferred embodiment of the cap member 44, said cap member 44 is color coded by label to identify the particular subject, course, or issue addressed by the reusable bulletin board display 10 contained in the storage device 40. Alternative embodiments contemplated for said cap member 44 include identification by means of a color coding about the entire cap member 44.

From the foregoing description, it will be recognized by those skilled in the art that a reusable bulletin board display 10 offering advantages over the prior art has been provided. Specifically, the reusable display 10 provides a means to reduce the waste of valuable teaching time and assist in the instruction of skills and objectives. The reusable bulletin board display 10 will reduce waste by allowing for the reuse and the storage of existing displays.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A reusable bulletin board display, for use in educational purposes, which is removably mountable on a conventional bulletin board or other similar surface, said reusable bulletin board display comprising:

a substrate consisting of a front side and a back side, said substrate being fabricated from a durable and flexible material to permit disposal of said bulletin board display within a cylindrical storage device, said back side of said substrate defining a plurality of indicators;

a laminate secured to and covering a substantial portion of said substrate; and a plurality of attachment devices disposed about a perimeter of said substrate for reusably attaching said reusable bulletin board display to the front side of the conventional bulletin board.

2. The reusable bulletin board display of claim 1, wherein said front side of said substrate defines a background, at least one border disposed about a perimeter of said background, at least one image within said border, and at least one interactive display area.

3. The reusable bulletin board display of claim 1, wherein said indicators are concentrically disposed about a perimeter of said back side of said substrate to indicate varying measurements to which said reusable bulletin board display may be altered.

4. The reusable bulletin board display of claim 1, wherein said devices are disposed about a perimeter of said back side of said substrate.

5. The reusable bulletin board display of claim 1, wherein said devices are selected from the group consisting of at least nails, staples, tacks, and hook and loop fasteners.

6. The reusable bulletin board display of claim 1, wherein said devices are hook and loop fasteners, a hook portion of said fastener being secured to said back side of said substrate and a loop portion of said hook and loop fastener being secured to the front side of the conventional bulletin board, said hook portion being positioned on said back side such as to be engagable with said loop portion secured to the conventional bulletin board.

7. The reusable bulletin board display of claim 1, wherein said cylindrical storage device includes a cap member.

8. The reusable bulletin board display of claim 7, wherein said cap member is provided with identification of said reusable bulletin board display received within said receptacle.

9. A reusable bulletin board display for use for educational purposes which is removably mountable on a conventional bulletin board or other similar surface, said reusable bulletin board display comprising:

a substrate consisting of a front side and a back side, said front side defining a background, at least one border disposed about a perimeter of said background, at least one image within said border, and at least one interactive display area, said back side defining a plurality of indicators concentrically disposed about a perimeter of said substrate, each of said plurality of indicators being provided for indicating alternative reusable bulletin board display dimensions, said substrate being fabricated from a durable and flexible material to permit storage of said bulletin board display within a cylindrical storage device, said storage device including a cap member bearing identification of said reusable bulletin board display received within said receptacle;

a laminate secured to and covering a substantial portion of said substrate; and a plurality of attachment devices disposed about a perimeter of said back side of said substrate, said attachment devices being selected from the group consisting at least of nails, tacks and hook and loop fasteners, each of said hook and loop fasteners consisting of a hook portion secured to said back side of said substrate and a loop portion secured to the front side of the conventional bulletin board, said hook portion being positioned on said back side of said substrate such as to be engagable with said loop portion secured to the conventional bulletin board for releasably attaching said reusable bulletin board display on a conventional bulletin board.

* * * * *